H. H. SCHUETTE.
THRESHING MACHINE.
APPLICATION FILED NOV. 1, 1915.
1,190,471.
Patented July 11, 1916.
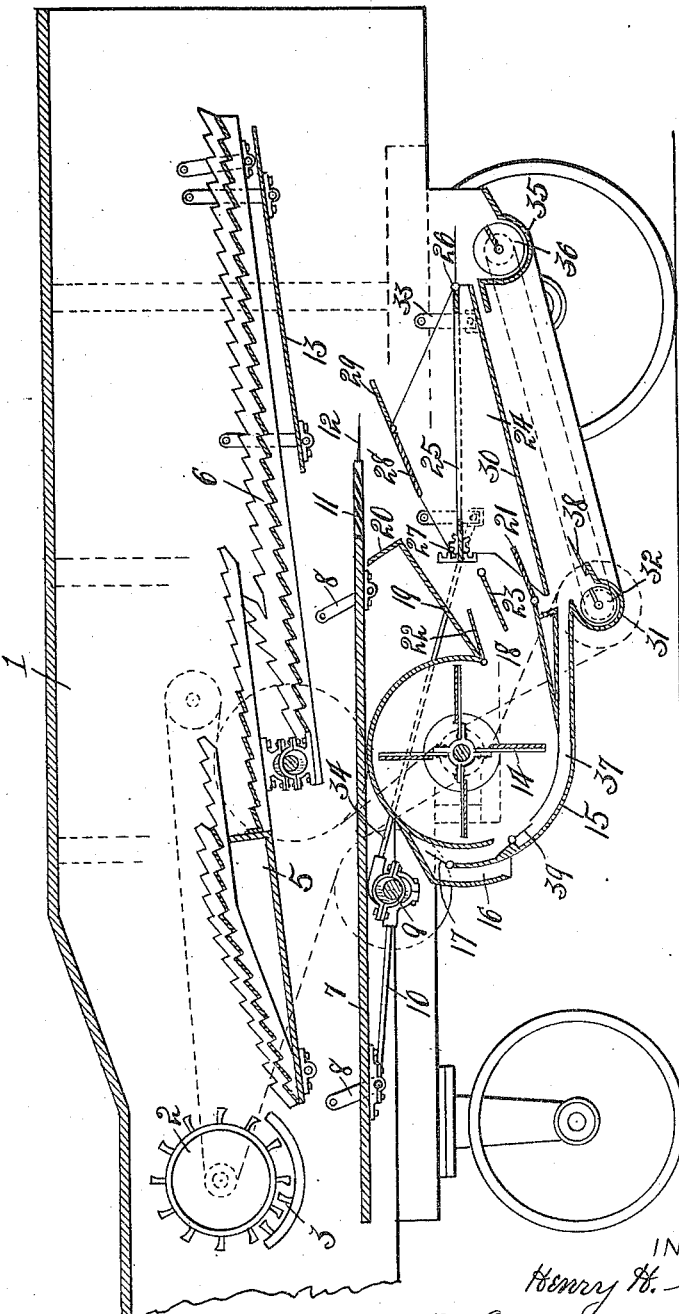
INVENTOR.
Henry H. Schuette,
By Owen, Owen & Crampton,
His attys.

UNITED STATES PATENT OFFICE.

HENRY H. SCHUETTE, OF NAPOLEON, OHIO.

THRESHING-MACHINE.

1,190,471.  Specification of Letters Patent.  Patented July 11, 1916.

Original application filed July 19, 1915, Serial No. 40,659. Divided and this application filed November 1, 1915. Serial No. 59,014.

*To all whom it may concern:*

Be it known that I, HENRY H. SCHUETTE, a citizen of the United States, and a resident of Napoleon, in the county of Henry and State of Ohio, have invented a certain new and useful Threshing-Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to grain threshing machines, and particularly to the grain cleaning and separating means thereof.

The object of my invention is the provision of certain improvements in machines of the class described whereby to enhance the practicability and efficiency thereof.

The invention is fully described in the following specification, and while, in its broader aspect, it is capable of embodiment in numerous forms, a preferred embodiment thereof is illustrated in the accompanying drawing which is a central vertical longitudinal section of a portion of a machine embodying the invention.

This application is a division of the application for patent Serial No. 40,659 filed by me in the United States Patent Office on July 19, 1915.

Referring to the drawings, 1 represents the frame of the machine which may be of any suitable design and construction. Mounted in the rear end of the frame 1 is the customary threshing cylinder 2, which operates over the concaves 3. Forward of the cylinder 2 is disposed the shaker-frames 5 and 6 over which the straw passes in its travel through the machine, said frames being mounted in any suitable manner for shaking movements to facilitate an advancing of the straw thereover and a separation of the grain therefrom, as is well understood in the art.

7 is a grain-bottom which extends under the threshing mechanism and shaker-frames 5 and 6. The forward and rear ends of the grain-bottom 7 are supported for swinging movements longitudinally of the machine by sets of rocker-arms 8 carried by the respective sides of the machine frame 1. A shaft 9, which is journaled transversely of the machine frame, below the grain-bottom 7, has eccentric rod connection 10 with the rear end portion of the grain-bottom, whereby longitudinal shaking movements are imparted to said bottom by a rotation of the shaft 9. The forward end portion of the grain-bottom 7 is provided with a grain-pan 11, and in advance of such grain-pan with forwardly projecting fingers 12. A grain-board or bottom 13 is swingingly suspended under the forward end portion of the straw-rack 6 to catch grain as it drops through the superposed portion of said rack and to direct it rearwardly to the grain-bottom 7, the member 13 terminating at its rear end over the grain-pan 11.

A blast-fan 14 is located within a circular housing 15 below the central portion of the grain-bottom 7, and said housing is provided at its rear side with an upwardly and downwardly extending air inlet passage 16, which is controlled by a wing form of valve 17 located, in the present instance, at the upper end of the center partition of the passage. At the lower forward side of the housing 15 is provided an outlet or blast-passage 18, the upper wall 19 of which extends upward and forward and terminates at its forward end in an upwardly turned flange 20 beneath the grain-pan 11 at the rear edge thereof. The bottom wall of the blast-passage 18 extends only a short distance from the housing 15 and terminates at its forward end in a pivoted blast-board 21, which is adjustable to restrict or enlarge the blast-passage 18, as is also a forwardly projecting blast-board 22, which is pivoted to the upper wall of the passage 18 at the rear or inner edge thereof. A blast-board 23 is disposed intermediate the blast-boards 21 and 22 and is pivoted at its forward edge as shown. The provision of the adjustable blast boards or gates 21, 22 and 23 in the blast-passage 18 in the arrangement shown and described permits a perfect control of the air blast through said passage.

24 is a shaker-frame, which is mounted immediately in advance of the air-blast passage 18 and carries a riddle or sieve 25 in position to intercept a portion of the air blast from said passage, provided the blast-boards or gates are properly adjusted for that purpose, as shown in the drawing. The riddle or sieve 25 is preferably pivoted at its forward end to the shaker-frame 24, as at 26, and has its rear end in vertically adjustable connection with the shaker-frame through the medium of a rack-bar and pinion connection 27, thus enabling the rear end of the sieve to be raised or lowered relative to the forward or pivoted end of the blast-board or gate 23. The riddle or sieve 25 has its rear end portion disposed below the grain-pan 11, whereby grain dropping through said pan is deposited on said riddle.

An inclined divider-board 28 for the air blast is fixedly carried by the shaker-frame 24 above the rear end portion of the riddle 25 and below the forward end portion of the grain-pan 11, and serves to intercept a portion of the grain dropping from the grain-pan 11 and to direct it into the rear end portion of the riddle. Pivoted to the forward end of the divider-board 28 is a divider-board 29, which is adjustable to regulate the quantity of the air blast which flows over or under the divider board. A raising of the divider-board 29 restricts the air passage between the divider-board and forward end of the grain-bottom 13 and causes more grain and coarse matter to flow down the board than would otherwise be the case, and a lowering of said board permits coarse matter to be blown over the top of the board. The shaker-frame 24 is provided below the riddle 25 in vertically spaced relation thereto with a rearwardly declining grain-bottom 30, which preferably terminates at its rear end slightly below the inner end portion of the blast-board or gate 21 and over the customary grain-trough 31 in which is mounted the grain-auger 32. A space is provided between the forward ends of the riddle 25 and bottom 30 to permit the passage of an air blast therebetween.

The shaker-frame 24 is carried for shaking or swinging movements longitudinally of the machine by two sets of rocker arms 33, which are pivotally suspended from respective sides of the machine frame. A rod 34 extends from the shaker-frame 24 and has eccentric connection with the shaft 9 whereby a rotation of said shaft imparts shaking movements to the shaker-frame.

The chaff and coarse matter, which is blown from the grain as it drops from the grain-pan 11 onto the riddle 25 and through said riddle to the bottom 30, is blown forward and the heavier particles thereof dropped into the tailing-trough 35 in which the tailing-auger 36 is mounted, as is well understood in the art.

The bottom of the fan housing 15 is provided with a shallow blast passage 37, which opens at its rear ends into the body portion of the fan chamber and at its forward end over the grain trough 31 in position to discharge a blast of air through the grain as it drops from the shaker-frame 24 into the grain-trough. The discharging of this air blast across the grain in this manner causes any chaff and dust remaining in the grain to be blown therefrom over the side flange 38 of the grain-trough. A gate-valve 39 is disposed at the inner end of the blast-passage 37 and controls the admission of air thereto from the fan chamber.

It will be understood that the cylinder 2, eccentric shaft 9, fan 14 and augers 32 and 36 are driven in the usual or any desired manner, as is well understood in the art, and as indicated by dotted lines in the drawing.

While I have herein shown and described one specific embodiment of my invention for illustrative purposes and have disclosed and discussed in detail the construction and arrangement incident to one specific application thereof, it is to be understood that the invention is not limited to the mere detail or relative arrangement of the parts, but that deviations from the illustrated form or embodiment of the invention may be made without departing from the spirit of the claims.

Having thus described my invention, what I claim as new, and desire to secure by Letters Patent, is,—

1. In a machine of the class described, blast means, a housing for said means having air inlet and outlet passages, a shaker frame mounted in the path of discharge of air from said outlet passage, said shaker-frame having an inclined bottom and a blast divider part at its top, and a riddle carried by said frame intermediate its bottom and divider part.

2. In a machine of the class described, blast creating means, a housing for said means having air inlet and outlet openings, a shaker frame mounted in advance of the outlet opening and having an inclined bottom and an inclined divider part at its top, an adjustable divider part, a riddle carried by said frame in vertically spaced relation to said bottom and divider part, blast gates disposed in said outlet opening, and a grain auger and tailing auger mounted respectively at the rear and forward ends of said bottom.

3. In a machine of the class described, a grain bottom, a blast creating member disposed below said grain bottom, a housing inclosing said member and having an inlet opening at one side and main and auxiliary outlet openings at the opposite side, said auxiliary opening being in the form of a shallow passage which extends under the main outlet opening, a shaker frame disposed in advance of said main opening and below the delivery end of the grain bottom, said shaker frame having a rearwardly declining bottom extending below the said main opening and adjacent to said auxiliary opening, a riddle carried by said shaker frame over its bottom, and grain delivery means disposed below the rear end of said shaker frame bottom and the outlet end of said auxiliary passage whereby the blast from said auxiliary passage is directed through grain as it flows from the shaker frame bottom into the said delivery means.

4. In a machine of the class described, a grain bottom, blast means below said grain bottom, a housing for said means having air inlet and outlet passages and having its outlet passage under an end portion of said grain bottom, a riddle disposed under the discharge end of said grain bottom in the path of discharge of air from said outlet passage, and an inclined blast divided part disposed between said riddle and the adjacent end portion of the grain bottom.

5. In a machine of the class described, a grain bottom, blast means below said grain bottom, a housing for said means having air inlet and outlet passages and having its outlet passage under an end portion of said grain bottom, a riddle disposed under the discharge end of said grain bottom in the path of discharge of air from said outlet passage, and a blast divider member between said riddle and the adjacent end of said grain bottom and having a vertically adjustable part.

6. In a machine of the class described, rotatable blast creating means, and a housing for said means having a circuitous air inlet passage at one side of the axis of rotation of said means.

7. In a machine of the class described, a blast-fan, a housing for said fan having a circuitous air inlet passage at one side of the fan axis, and an adjustable valve in said passage for regulating the flow of air therethrough.

8. In a machine of the class described, a blast fan, and a housing therefor having an air inlet passage which extends first upward and then downward into the interior of the housing in substantially tangential relation to the fan.

9. In a machine of the class described, a blast-fan, a housing for said fan having an air inlet passage therein at the side of the fan axis, said passage extending backward and forward and having its air discharge in substantially tangential relation to the fan, and an adjustable valve disposed in said passage to regulate the flow of air therethrough.

10. In a machine of the class described, a blast fan, a housing therefor having air inlet and outlet passages at opposite sides of the fan axis and having an auxiliary air inlet passage extending along the bottom thereof from a point below the fan, and a gate for regulating said auxiliary passage.

In testimony whereof, I have hereunto signed my name to this specification.

HENRY H. SCHUETTE.

Copies of this patent may be obtained for five cents each, by addressing the "Commissioner of Patents, Washington, D. C."